United States Patent
Beschorner et al.

(10) Patent No.: US 9,394,928 B2
(45) Date of Patent: *Jul. 19, 2016

(54) DYNAMIC SEAL WEAR MITIGATION SYSTEM

(71) Applicant: Caterpillar Inc., Peoria, IL (US)

(72) Inventors: Matthew J. Beschorner, Plainfield, IL (US); Aleksandar M. Egelja, Naperville, IL (US); Eric Hughes, Metamora, IL (US); Mikhail Sorokine, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 453 days.

This patent is subject to a terminal disclaimer.

(21) Appl. No.: 13/832,085

(22) Filed: Mar. 15, 2013

(65) Prior Publication Data

US 2014/0034133 A1     Feb. 6, 2014

Related U.S. Application Data

(60) Provisional application No. 61/677,744, filed on Jul. 31, 2012.

(51) Int. Cl.
    F17D 1/00     (2006.01)
    F15B 19/00     (2006.01)
    (Continued)

(52) U.S. Cl.
CPC ............. F15B 19/005 (2013.01); F15B 20/008 (2013.01); F16K 11/0712 (2013.01); F16K31/12 (2013.01); F16K 37/005 (2013.01); F16K 37/0041 (2013.01); F15B 2211/30575 (2013.01); F15B 2211/329 (2013.01); F15B 2211/36 (2013.01); F15B 2211/6316 (2013.01); F15B 2211/8636 (2013.01); F15B 2211/87 (2013.01); Y10T 137/0318 (2015.04); Y10T 137/7768 (2015.04); Y10T 137/8326 (2015.04)

(58) Field of Classification Search
CPC ............... Y10T 137/87225; Y10T 137/87217; Y10T 137/8326; Y10T 137/8158; Y10T 137/2589; Y10T 137/2574; Y10T 137/2622; Y10T 137/2635; Y10T 137/0318; Y10T 137/7768; F15B 2211/36; F15B 2211/6355; F15B 2211/857; F15B 2211/8636; F15B 2211/8752; F15B 19/005; F15B 20/008; F15B 13/035; F15B 2211/20546; F15B 2211/50518; F15B 2211/55; F15B 2211/6316; F15B 221/30575; F15B 2211/329; F15B 2211/87; F16K 37/0041; F16K 31/12; F16K 37/005; F16K 11/0712
USPC .......... 137/557, 551, 596.18, 596.17, 115.01, 137/115.07, 115.18, 115.19, 115.23, 487.5
See application file for complete search history.

(56) References Cited

U.S. PATENT DOCUMENTS 3,344,807 A * 10/1967 Lehrer et al. ................... 137/557
4,194,528 A     3/1980 Kepler
(Continued)

FOREIGN PATENT DOCUMENTS

EP     2182341     5/2010
JP     2002310101     10/2002

*Primary Examiner* — Craig J Price
(74) *Attorney, Agent, or Firm* — M. Daniel Spillman

(57) ABSTRACT

A system can include one or more valve arrangements with a working chamber to receive a working fluid at a first pressure, and a control chamber to receive fluid at a second pressure. A dynamic seal can be disposed on a land of a valve element. A supply passage can be in communication between the control chamber and a tank and can include a check valve. A relief valve can be disposed between the check valve and the control chamber. A pilot pump and another relief valve may be disposed upstream of the check valve. The relief valve downstream of the check valve can have a higher pressure limit than the downstream one. A pressure sensor may be disposed between the check valve and the control chamber and used to warn the operator of a high pressure in the control chamber.

14 Claims, 3 Drawing Sheets

(51) Int. Cl.
*F16K 37/00* (2006.01)
*F15B 20/00* (2006.01)
*F16K 31/12* (2006.01)
*F16K 11/07* (2006.01)

(56) References Cited

U.S. PATENT DOCUMENTS

| | | |
|---|---|---|
| 4,217,934 A | 8/1980 | Peters |
| 4,643,228 A | 2/1987 | Spencer |
| 4,911,192 A * | 3/1990 | Hartfiel et al. ............. 137/487.5 |
| 5,161,376 A | 11/1992 | Hartmann |
| 5,348,036 A | 9/1994 | Oksanen et al. |
| 5,377,488 A | 1/1995 | Malina |
| 6,128,946 A * | 10/2000 | Leon et al. ........................ 73/46 |
| 6,338,358 B1 * | 1/2002 | Watanabe et al. .......... 137/487.5 |
| 7,318,447 B2 * | 1/2008 | Law ........................... 137/487.5 |
| 7,621,211 B2 | 11/2009 | Ma et al. |
| 8,887,748 B2 * | 11/2014 | Pucher ....................... 137/487.5 |
| 2010/0152907 A1 | 6/2010 | Meier et al. |
| 2010/0179697 A1 | 7/2010 | Stelter et al. |

* cited by examiner

DYNAMIC SEAL WEAR MITIGATION SYSTEM

RELATED APPLICATIONS

This application is based upon and claims the benefit of priority from U.S. Provisional Application No. 61/677,744 by Matthew J. Beschomer et al., filed Jul. 31, 2012, the contents of which are expressly incorporated herein by reference, and U.S. Provisional Application No. 61/695,349 by Matthew J. Beschorner et al., filed Aug. 31, 2012, the contents of which are expressly incorporated herein by reference.

TECHNICAL FIELD

The present disclosure relates generally to a hydraulic system, such as for a work machine, and in particular, to a system and method for detecting and/or mitigating wear of a dynamic seal used in a valve device of a hydraulic system.

BACKGROUND

Control valves have many different applications, such as controlling pressure downstream from the valve, controlling levels in tanks or reservoirs either upstream or downstream from the valve, reducing undesirable effects of pressure surges in supplies due to actuating related valves or pumps, etc. The valves have a valve element that is modulated or throttled to throttle flow through the valve to attain a desired pressure drop or flow condition across the valve. A fluid-filled, variable volume control chamber is sealed with a movable partition means, for example a piston with a dynamic seal or sliding resilient seal, such as e.g., a flat or rolling flexible diaphragm. The dynamic seal isolates the control chamber having low pressure control pressure from the main flow through the valve having high working pressure. The piston and dynamic seal are movable within the valve body in response to pressure changes within the control chamber. A pilot pressure system is coupled to the control chamber. The pilot system generates at least one type of pressure signal which is processed following conventional techniques and generates a control signal which is fed into the control chamber used to control position of the main valve member.

However, the dynamic seal is subject to wear and potential failure due to substantial movement, manufacturing defects, and/or aging. When there is unexpected failure of the dynamic seal, undesirable interaction may occur between the low pressure control pressure and the high pressure working pressure. As a result, the control pressure is uncontrollably increased or decreased such that the piston position can change to a undesirable position and may cause damage to the pilot controlled solenoid. For example, the leakage into the control chamber can be sufficiently high to break or deform bolts that hold on the flange of the solenoid to the valve body. Once bolt failure has occurred, pilot pressure control is lost from leakage outside the valve body, and the corresponding machine actuator cannot be moved. Because the dynamic seal is contained within the valve itself and not visible from the outside, inspection of the dynamic seal without dismantling the valve is usually impractical. Hence, there is a tendency either to replace the dynamic seal prematurely rather than risk failure in normal use or to neglect replacement resulting in valve damage.

U.S. Pat. No. 5,348,036 to Oksanen describes an automatic control valve having a main valve member movable between open and closed positions in response to pressure applied to a first piston or diaphragm in a first control chamber to modulate flow through the valve to maintain desired flow conditions. Pilot pressure signals are generated to reflect the flow conditions, usually upstream and downstream from the valve and processed to generate a control signal fed to the first control chamber to control pressure therein. Wear of the valve causes leakage of the diaphragm or seal of the piston causing loss of primary control of the valve member which tends to fail open. An initial rise in flow through the valve is initially caused which is detected by the pilot pressure signal but because of the leakage, is unable to correct. When pilot pressure signals reflect primary control failure, a back-up piston or diaphragm moves to an active position and selectively cooperates with the main valve member to control flow conditions through the valve independently of the first control chamber, without regard to pressure control.

SUMMARY

In one example, a system can have at least one valve device that includes a valve body and a valve element slidably disposed within a passageway formed in the valve body. A first segment of the valve element and the valve body can be arranged to define a working chamber that receives a working fluid at a first pressure. The valve body and the valve element can be arranged to define a control chamber to receive a control fluid at a second pressure. An annular seal element can be disposed about a land of the valve element. The seal element and the land can be together arranged to separate the working chamber and the control chamber and to move with axial movement of the valve element. A pressure monitoring system can be coupled to the control chamber, including, e.g., a pressure sensor that can be associated with the control chamber. A controller can be in communication with the pressure sensor. The controller may be configured to perform at least one of receive a signal indicative of the second pressure, compare the second pressure with a predetermined pressure, and communicate a warning signal to an operator when the second pressure is at or above the predetermined pressure.

In one example, a system can have at least one valve device that includes a valve body and a valve element slidably disposed within a passageway formed in the valve body. A first segment of the valve element and the valve body can be arranged to define a working chamber that receives a working fluid at a first pressure. The valve body and the valve element arranged to define a control chamber separated from the working chamber to receive fluid at a second pressure. A seal can be formed between a land of the valve element and the valve body. A supply passage can be in communication with the control chamber and extending to a tank. A check valve can be coupled to the supply passage. A relief valve can be coupled to the supply passage and disposed between the check valve and the control chamber. In another example, a pressure sensor may be also coupled to the supply passage and disposed between the check valve and the control chamber.

In one example, a method of mitigating seal wear provided with at least one valve device is provided. The valve device may include a valve body having a passageway formed therein. A valve element can be disposed within the passageway of the valve body and operable to move axially relative to the valve body. A working chamber can be defined between the valve element and the valve body to receive fluid at a first pressure. A control chamber can be defined between the valve element and the valve body and can be separated from the working chamber by a land to receive fluid at a second pressure via a supply passage. An annular seal, such as, e.g., a dynamic seal, can be disposed about the land and configured to move with axial movement of the valve element. A check valve can be coupled to the supply passage, and a relief valve can be coupled to the supply passage between the check valve and the control chamber. The method can include supplying pressurized fluid at a first pressure to the working chamber; supplying pressurized fluid at a second pressure to the control chamber; and selectively moving the relief valve at a preset pressure limit to permit passage of pressurized fluid at the second pressure to a tank.

Although the drawings depict exemplary embodiments or features of the present disclosure, the drawings are not necessarily to scale, and certain features may be exaggerated in order to better illustrate and explain various embodiments of the present disclosure. The exemplifications set out herein illustrate exemplary embodiments or features of the disclosure and such exemplifications are not to be construed as limiting the scope of the disclosure in any manner.

DETAILED DESCRIPTION

Reference will now be made in detail to various embodiments of the disclosure, examples of which are illustrated in the accompanying drawings. Wherever possible, the same reference numbers will be used throughout the drawings to refer to the same or like parts.

Figure 1:
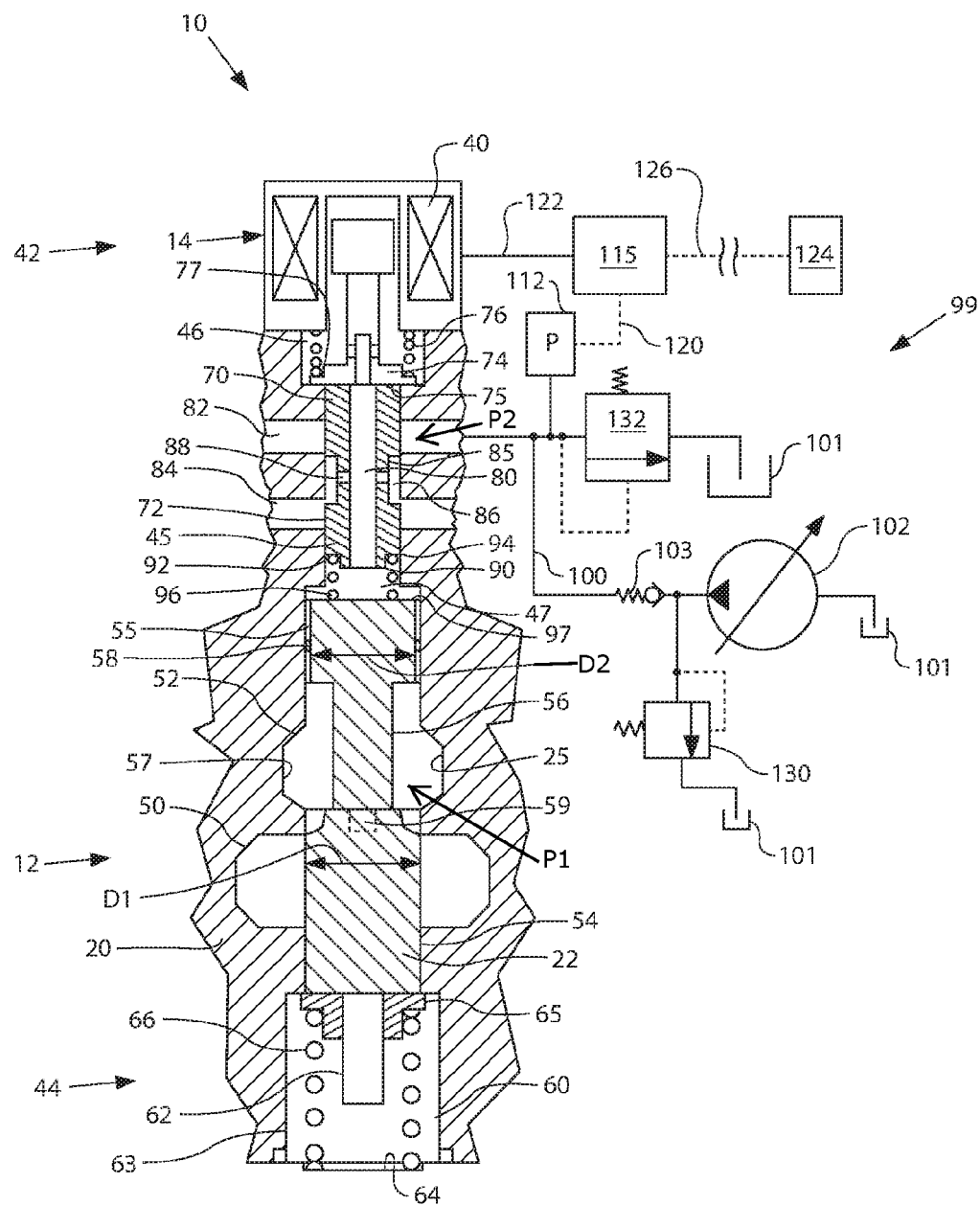
FIG. 1 is a cross-sectional view of a valve device coupled to a pressure monitoring system.

In FIG. 1, one example of a hydraulic system 10 having a valve device 12 coupled to a pilot control assembly 14. In one example, the valve device 12 may be an independently-operated, electronically-controlled metering valve. The valve device can control fluid flow between a pump, a tank, and/or a hydraulic actuator, or between any other hydraulic components. The valve device 12 can include a cylindrical hollow valve body 20 and a valve element 22 disposed within a passageway 25 of the valve body 20. The valve element 22 can be configured to separate a working chamber for passage of a working fluid having a working pressure P1 and a control chamber for passage of a control fluid having a control pressure P2. The working chamber can include one or more inlet ports (not shown) and one or more outlet ports (not shown) coupled to a hydraulic working circuit. Working fluid can enter the working chamber through an inlet port and exit the working chamber through an outlet port. The control chamber can include one or more inlet ports (not shown) and one or more outlet ports (not shown) coupled to a hydraulic pilot circuit. Control fluid can enter the control chamber through the inlet port and exit the control chamber through the outlet port. The position of the valve element 22 can be controlled such that the working fluid exiting the working chamber has a desired flow rate and/or pressure. The valve element 22 may be capable of moving axially within the valve body 20 based on pressure differences within the working chamber and the control chamber, as will be described.

The pilot control assembly 14 can include a proportional electromagnetic device 40 or solenoid assembly at a proximal end 42 of the valve body 20. Throughout the description, the term "proximal" will refer to a position or a direction toward the proximal end 42 of the valve body, whereas the term "distal" will refer to a position or a direction toward a distal end 44 of the valve body 20, which lies opposite the proximal end 42.

FIG. 1 illustrates one example of an electromagnetic device, and as can be appreciated by those skilled in the art, other arrangements can be utilized to achieve similar functionality. For example, the electromagnetic device 40 may include an armature 45 that may be hydraulically balanced between a pair of control chambers 46, 47 that may be formed in the valve body 20, which together generally can define the control chamber. The electromagnetic device 40 may be operable to move the armature 45 between a first position and a second position, typically from the first position to the second position. The electromagnetic device 40 may be controlled in any manner readily apparent to one skilled in the art, such as through electrical signals generated by a controller. For example, a computer or microprocessor may cause an electric current to be applied to the electromagnetic device 40. The application of the electric current can energize the electromagnetic device 40 and generate a magnetic field that causes the armature 45 to move in the direction to the second position to permit control fluid to enter at least one of the control chambers 46, 47. A pilot supply, described later, can provide a pressurized control fluid selectively to at least one of the control chambers 46, 47 via the pilot control assembly. The hydraulic pilot circuit can include the pilot supply coupled to a main pump or a separate pilot pump with an associated relief valve, or any other conventional source of pressurized fluid known in the art.

The valve element 22 can comprise a spool configuration slidably disposed within the passageway 25 of the valve body 20 for controlling fluid communication between respective inlet and outlet ports. For example, the valve body 20 may include first and second annular cavities 50, 52 or more formed therein and axially spaced from one another to open into the passageway 25. The valve element 22 may include a first land 54 distally spaced from a second land 55 and a reduced-diameter portion 56 between the lands 54, 55. The annular region defined between the reduced-diameter portion 56 and an inner surface 57. The inner surface 57 can define the passageway 25 of the valve body 20 and may define generally the working chamber.

The first land 54 can have a first diameter D1 that is sized approximately the same as the inner diameter of the passageway 25 to allow for sliding along the inner surface 57. The second land 55 can have a second diameter D2. The second diameter D2 may be sized slightly less than the first diameter D1. A dynamic or reciprocating annular seal 58 can be disposed between the outer circumference of the second land 55 and the inner surface 57. In one example, the inner surface 57 can be the surface defining the passageway 25. However, in other examples, the inner surface 57 may be associated with an inner surface defining the opening formed in a cylindrical sleeve or other component, rather than being associated with the valve body. The dynamic seal 58 may be partially disposed within an annular groove formed in the second land 55. The dynamic seal 58 is configured to inhibit fluid communication between pressurized fluids in the control and working chambers, while being configured to move axially with axial movement of the valve element 22. In one example, the dynamic seal 58 can take the form of an elastomeric O-ring, having a circular, rectangular, other geometric cross-sections, including irregular cross-sectional shapes, or other designs as appreciated by those skilled in the art. In another example, the dynamic seal 58 can take the form of a polytetrafluoroethylene (PTFE) ring, which may be more lubricious than an elastomeric material. The dynamic seal may include an opposing dual cup seal, where a first cup seal element is disposed in a confronting relationship with a second cup seal element, together forming a rectangular-like seal.

The first and/or second lands 54, 55 of the valve element 22 may include one or more metering slots at ends that correspond to the reduced-diameter portion 56. For example, if provided, metering slots 59 can be formed at a proximal end of the first land 54 to provide fluid communication between the annular cavities 50, 52, when the valve element 22 is moved in either direction a sufficient distance. For instance, the metering slots 59 are configured to provide fluid communication between the annular cavities 50, 52 when the valve element 22 moves distally a sufficient distance for the metering slots 59 to open to the first annular cavity 50. In one example, the first land 54 may have four metering slots 59 at its proximal end, which are disposed in two diametrically-opposed pairs. The metering slots 59 may be semi-circular. However, it should be appreciated that the first and/or the second land may include more or less than four metering slots. It should further be appreciated that the metering slots may be shaped and positioned as necessary to achieve desired performance results.

A spring chamber 60 may be disposed at the distal end 44 of the valve body 20. The spring chamber 60 may be integrally formed with the valve body 20 or may be a discrete cylindrical member coupled to the valve body. The valve element 22 may also include a reduced-diameter distal portion 62 to be disposed in the spring chamber 60. An expanded-diameter passageway 63 and the distal end 44 of the valve body 20 may define the spring chamber 60. A groove 64 may be formed into the distal end of the valve body 20. The spring chamber 60 may be in communication with the tank so that any fluid leakage in the spring chamber 60 can be drained. A limiting collar 65 may be disposed on the distal portion 62 of the valve element 22 to limit the movement of the valve element 22 in a proximal direction. The spring chamber 60 can house a first spring 66, which can be disposed between a distal end of the valve element 22 and a proximal inner surface of the groove 64 of the spring chamber 60. The first spring 66 can provide a centering bias to the valve element 22 in a proximal direction.

As shown in FIG. 1, the armature 45 may have a first land 70 proximally spaced from a second land 72. A first control limiting collar 74 may be disposed at a proximal end 75 of the first land 70 to limit the movement of the armature 45 in the distal direction. A second spring 76 may be disposed in the proximal control chamber 46 between the electromagnetic device 40 and a spring shoulder 77 disposed on the first control limiting collar 74. The armature 45 and the first control limiting collar 74 may include a longitudinal throughbore 80 extending the length thereof. The longitudinal throughbore 80 can provide fluid communication between the proximal control chamber 46 and the distal control chamber 47.

As a result, the armature 45 may have a pressure balance. The force of the second spring 76 can bias the armature 45 in a direction away from the electromagnetic device 40 to close communication between a proximal control annular cavity 82 formed in the valve body 20 and the passageway 25 and to open communication between the passageway 25 and another distal control annular cavity 84 formed in the valve body 20. The control annular cavities 82, 84 can be axially spaced along and open into the passageway 25 within the axial range of the armature 45. A pilot supply can provide low pressure fluid to the proximal control annular cavity 82 about the armature 45. A tank or drain can be in fluid communication with the distal control annular cavity 84 about the armature 45, such as, e.g., via a drain passage.

The armature 45 may include a reduced-diameter portion 85 forming an annular chamber 86 between the lands 70, 72. The reduced-diameter portion 85 may include at least one transverse throughbore 88 that opens to the annular chamber 86, for example, at diametrically-opposed sides of the reduced-diameter portion 85. Additional transverse and/or longitudinal throughbores may be provided to meet desired performance criteria. A distal end 90 of the armature 45 may also include an annular groove 92 to form a distally-facing shoulder 94. Axial spacing between the armature 45 and the valve element 22 can define the distal control chamber 47 within the passageway 25. A third spring 96 can be disposed in the distal control chamber 47 between the distally-facing shoulder 94 of the armature 45 and a proximal end 97 of the valve element 22. Thus, the third spring 96 can bias the armature 45 away from the valve element 22 and against the bias of the second spring 76.

FIG. 1 illustrates one example of a valve system. It can be appreciated by those skilled in the art that the components, such as the springs, the valve element or armature, lands, slots, and the like, can be differently arranged to perform consistently with the system 10 described herein. For example, for another type of valve system (not shown), such as a push type valve, the first spring 66 may be located circumferentially along a portion of the valve element 22 for centering the valve element 22. This leaves the spring chamber 60 without a first spring. The spring chamber 60 may be in fluid communication with the distal control chamber 47. These respective chambers 47, 60 can be at equal pressure to provide axially opposing fluid forces to the valve element 22. The biasing force of the first spring 66 and the third spring 96 can be sized such that when the chambers 47, 60 are at equal pressure, a force balance is formed and the valve element 22 is maintained at its closed position. Movement of the armature 45 can cause the spring chamber 60 to open to drain, thereby reducing the control pressure and creating a pressure differential. With no longer a force balance, the valve element can be urged to move to its open position. Movement of the armature 45 in the opposite direction can cause the spring chamber 60 to open to the pilot supply, thereby increasing the control pressure in order to restore a force balance and allow the valve element to return to its closed position.

In FIG. 1, the system 10 can also include a pressure-monitoring system 99 that is associated with at least one of the control chambers 46, 47 of the pilot control assembly 14. The system 99 can be operable to mitigate the risk of damage caused by wear of dynamic seal 58, typically caused by overuse, defective manufacturing, or negligent servicing. The system 99 may be used to detect failure of the dynamic seal 58 and notify the operator of its failure so that the operator can safely take precautions during machine operation.

In one example, the system 99 may include a detection system for dynamic seal wear 58. A supply conduit 100 in fluid communication with the one of the cavities, such as, for example, the proximal control annular cavity 82 can be extended therefrom to a tank 101. A pilot pump 102, such as a fixed displacement or variable displacement pump, can be associated with the supply conduit 100. Fluid supplied from the tank 101 can be pressurized by the pilot pump 102, and the pressurized fluid can be supplied to the control chamber via the proximal control annular cavity 82. A load-hold check valve 103, which may have a biasing element such as a spring, may be provided downstream of the pilot pump 102.

A pressure sensor 112 can be associated with the supply conduit 100 to detect the pressure of the control fluid within the supply conduit 100, which can correspond to the control pressure $P_2$ of the control chamber. A controller 115 may be electronically coupled to the pressure sensor 112 via a communication line 120. The same controller 115 or a different controller may be in electrical communication with the electromagnetic device 40 of the pilot control assembly 14 via a communication line 122. The pressure sensor may be housed in the end plate of the valve body where the electromagnetic device attaches to the valve body. Additional pressure sensors may be provided throughout the pilot circuit for additional pressure data. The pressure sensor may be mounted within the control chamber itself.

The controller 115 may be embodied in a single microprocessor or multiple microprocessors that include a means for controlling an operation of the pilot control assembly 14. The controller 115 may be embodied in a single microprocessor or multiple microprocessors that include a means for receiving signals from the pressure sensor indicative of control pressure of the control chamber, comparing the sensed pressure with a predetermined pressure, and if greater than the predetermined pressure, communicating a warning via an audio and/or visual indicator 124 to the operator. The audio and/or visual indicator can be provided in various forms such as a light, a speaker, a graphical operator interface, or other indicators known in the art. Numerous commercially available microprocessors can be configured to perform the functions of the controller. The controller may include a memory, a secondary storage device, a processor, data bus and any other components for running an application. Various other circuits may be associated with the controller such as power supply circuitry, signal conditioning circuitry, solenoid driver circuitry, and other types of circuitry.

The controller 115 may retrieve or store pressure data in a database. The controller may compare present pressure data with pressure data contained or stored within the database. The database may be pre-programmed with design data or may store historical data related to the pressure data. The database may utilize data structures, index files, or any other data storage and retrieval technique, without any limitation.

For example, the controller 115 may be configured to receive signals from the pressure sensor 112 indicative of a pressure P2 of the control chamber. When the seal becomes ineffective, e.g., from wear or defect, the pressure detected, or pressure P2, in the control chamber can rise above and/or fall below an expected pressure range of the control chamber. When outside the expected pressure range, the controller 115 can communicate via communication lines 126 a warning signal indicative of the seal failure.

In another example, the system 99 may include a mitigation system for dynamic seal wear, instead of or in addition to the detection system described herein. A first relief valve 130 and a second relief valve 132 can be coupled to the supply conduit 100, disposed between the control chamber and the tank 101. For example, the first relief valve 130 can be fluidly coupled between the check valve 103 and the pilot pump 102, and the second relief valve 132 can be fluidly coupled downstream of the first relief valve 130. In one example, the check valve 103 can be fluidly coupled between the first and second relief valves 130, 132.

Each of the first relief valve 130 and the second relief valve 132 can have a valve element that is movable between a first closed position and a second open position. A biasing member may be associated with the valve element in order to bias the valve element in one of its positions, such as being biased in the first closed position. Each relief valve 130, 132 may be operable to maintain its position in the first closed position, until the pressure within the supply conduit 100 is greater than a threshold pressure, then each relief valve 130, 132 can be moved to its second open position. When in the second open position, the fluid within the supply conduit 100 can be drained to the tank 101. A signal conduit may be associated with each relief valve to provide an upstream signal pressure representative of the pressure within the supply conduit 100, which is indicative of a force on the end opposite the biasing member. For instance, when the pressure in the supply conduit is sufficiently high, the force indicative of the higher pressure can be greater than the biasing force provided by the biasing member to move the valve element of the relief valve to the other position, such as the second open position.

The maximum threshold pressure of each of the relief valves 130, 132 can be selected to prevent damage to the pilot system and to mitigate the risk of damage to the valve system. The second relief valve 132 can be set at a higher pressure limit than the first relief valve 130. To this end, the first relief valve will move to its open position prior to the second relief valve. In this instance, downstream pressure between the check valve 103 and the valve device 12, which is representative of the control chamber pressure, can increase due to a seal leakage from the high pressure side of the working chamber. The relief valves may be housed in the end plate of the valve body where the electromagnetic device 40 attaches to the valve body.

Figure 2:
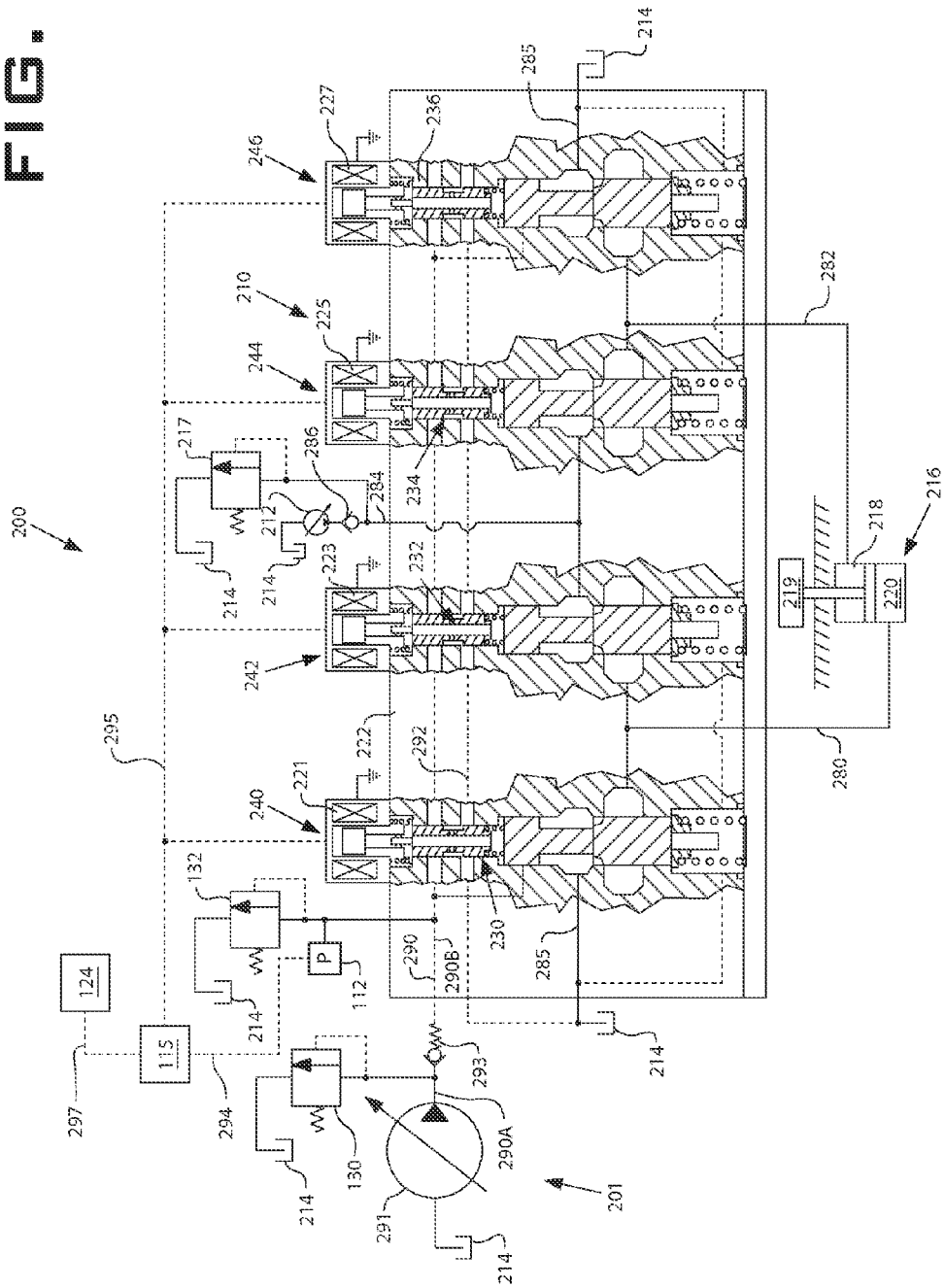
FIG. 2 is schematic depicting a hydraulic system having four valve devices coupled to a pressure monitoring system.
Figure 3:
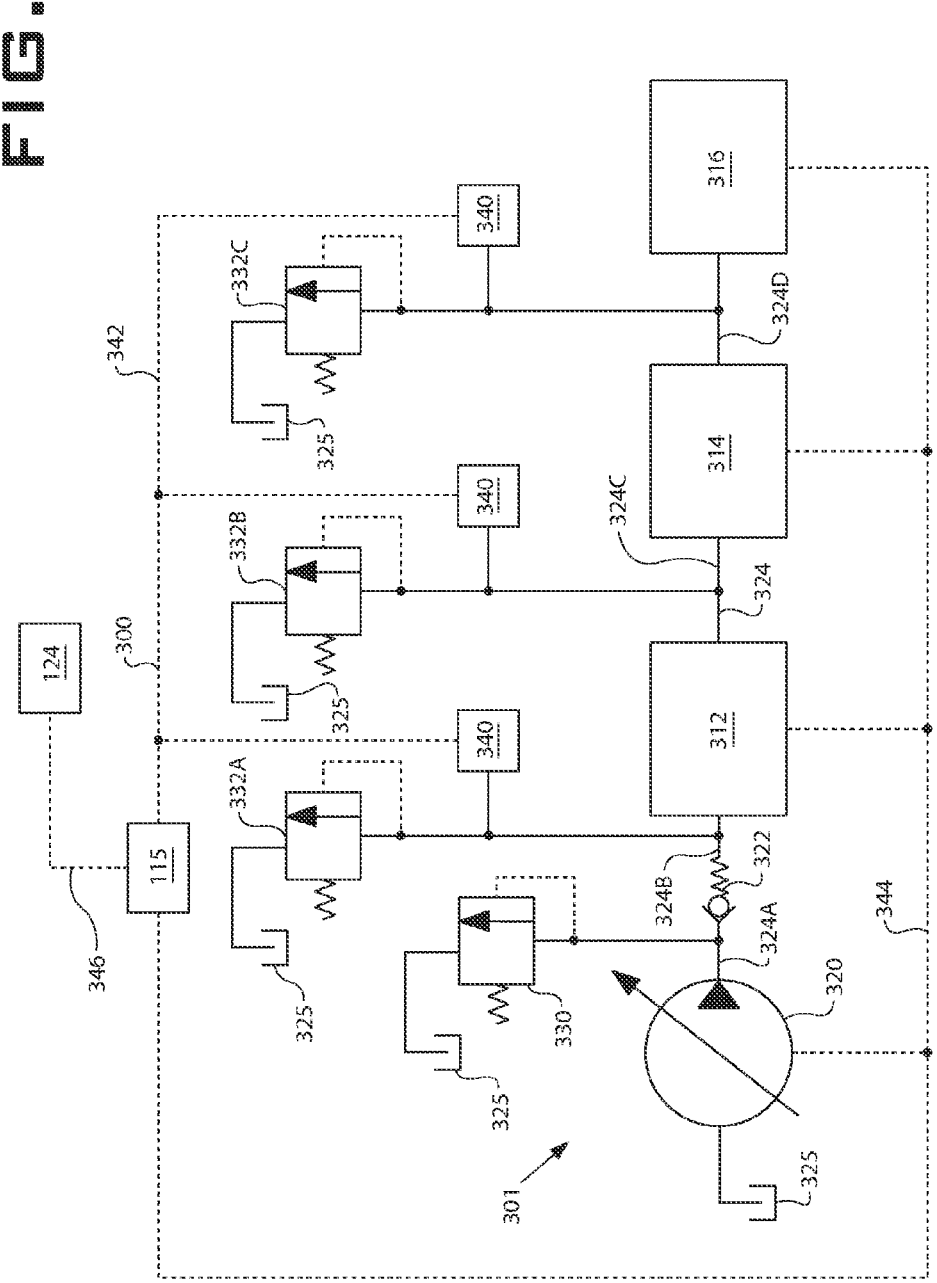
FIG. 3 is schematic depicting a hydraulic system having four valve arrangements coupled to a pressure monitoring system.

FIG. 2 illustrates a hydraulic system 200 with more than one valve devices associated with a pressure monitoring system 201, for example, a centrally located system, used for detection and/or mitigation of dynamic seal wear. It can be appreciated by those skilled in the art that a pressure monitoring systems with multiple relief valves throughout the pilot circuit can be used with system 200, such as shown in FIG. 3. The valve devices can independently or integrally form an electrohydraulic valve assembly 210. The electrohydraulic valve assembly 210 is shown in combination with a main pump 212, a fluid reservoir such as a tank 214, and a fluid actuator 216 such as a hydraulic cylinder or motor. The main pump 212 may include, for example, a high pressure pump to supply a working fluid having a working pressure P1. A relief valve 217 can be disposed between the main pump 212 and each of the valve devices of the valve assembly 210. The relief valve 217 can be movable between a normally closed position and an open position. In response to the working fluid pressure being at or above a predetermined threshold pressure, the relief valve 217 can be moved to the open position to permit the passage of fluid to the tank 214.

In one example, the actuator 216 can be a hydraulic cylinder having a rod end chamber 218, a head end chamber 220, and an output member 219. In one example, the valve assembly 210 may include a single valve body 222 having a plurality of passageways 230, 232, 234, 236. The diameter of each passageway may vary along its length. The valve assembly 210 also may include a plurality of independently-operated, electronically-controlled valve devices 240, 242, 244, 246 individually seated in the passageways 230, 232, 234, 236, respectively. Although four valve devices are shown, the system 200 may include two, three, five, or more valve devices.

Each of the valve devices 240, 242, 244, 246 may be configured similarly to the valve device 12 shown in FIG. 1. The valve devices 240, 242, 244, 246 can include a proportional electromagnetic device 221, 223, 225, 227, respectively, at an end of the valve body 222. In one application, the plurality of valve devices 240, 242, 244, 246 can be configured to control fluid flow between the main pump 212, the tank 214, and the actuator 216. For example, the valve devices may be referred to individually as a cylinder-to-tank head end (CTHE) metering valve device 240, a pump-to-cylinder head end (PCHE) metering valve device 242, a pump-to-cylinder rod end (PCRE) metering valve device 244, and a cylinder-to-tank rod end (CTRE) metering valve device 246.

A head end cylinder conduit 280 can provide fluid communication between the first annular cavity 50 of the corresponding PCHE and CTHE valve devices 240, 242 and the head end chamber 220 of the actuator 216. A rod end cylinder conduit 282 can connect the first annular cavity 50 of the corresponding PCRE and CTRE valve devices 244, 246 with rod end chamber 218 of the actuator 216. An inlet conduit 284 can provide communication between the main pump 212 and the second annular cavity 52 of the corresponding PCHE and PCRE valve devices 242, 244 and may contain a load-hold check valve 286. A tank conduit 285, for example, can provide communication between the tank 214 and the second annular cavity 52 of the corresponding CTHE, CTRE valve devices 240, 246.

A pilot supply 290 can provide a low pressure fluid to the proximal control annular cavity 82 of the corresponding valve devices 240, 242, 244, 246. The pilot supply 290 may include the main pump with an associated pressure reducing valve, a separate pilot pump with an associated relief valve, or any other conventional source of pressurized fluid known in the art. FIG. 2 shows a separate pilot pump 291 with a load-hold check valve 293. The proximal control annular cavity 82 (referring to FIG. 1) of the corresponding valve devices 240, 242, 244, 246 can be in fluid communication with the tank 214 via the pilot supply 290 and the distal control annular cavity 84 (referring to FIG. 1) can be in fluid communication via a common drain passage 292.

The system 201 can include the pressure sensor 112 coupled to the pilot supply 290 that extends to the tank 214. The pilot supply 290 can couple to at least one of the control chambers of each of the valve devices 240, 242, 244, 246. The pressure sensor 112 can be associated with the pilot supply 290 to detect the pressure of the control fluid within the pilot supply 290, which can correspond to the highest control pressure P2 of the control chamber of the valve devices 240, 242, 244, 246. The controller 115 may be electronically coupled to the pressure sensor 112 via a communication line 294, and may also be electronically coupled to the electromagnetic devices 221, 223, 225, 227 of the valve devices 240, 242, 244, 246 via a communication line 295. The controller 115 may communicate a warning via an audio and/or visual indicator 124 to the operator via a communication line 297.

The first relief valve 130 and the second relief valve 132 can be coupled to the pilot supply 290, disposed between the control chamber and the tank 214. Each relief valve 130, 132 can have a valve element that is movable between a first closed position and a second open position. Each relief valve 130, 132 may be operable to maintain its position in the first closed position, until the pressure within the corresponding segments 290A, 290B of the pilot supply 290 is greater than a predetermined threshold pressure limit preset with each relief valve, then each relief valve is moved to its second open position. When in the second open position, the fluid within the corresponding segment of the pilot supply 290 can be drained to the tank 214. The predetermined threshold pressure of the first relief valve 130 can be set to be less than the predetermined threshold pressure of the second relief valve 132. The second relief valve 132 can be set higher to allow the pressure sensor 112 to measure anomaly pressures variations between the first threshold pressure of the first relief valve 130 and the second threshold pressure of the second relief valve 132 in pilot supply.

The maximum threshold pressure of each of the relief valves 130, 132 can be selected to prevent damage to the pilot system to mitigate the risk of damage to the valve system. The second relief valve 132 can be set at a higher pressure limit than the first relief valve 130. To this end, the first relief valve will move to its open position prior to the second relief valve. In this instance, downstream pressure between the check valve 293 and one or more of the valve devices 240, 242, 244, 246 of the pilot supply segment 290B can increase during a seal leakage from the high pressure side of the working chamber. Here, since the valve devices 240, 242, 244, 246 can be fluidly coupled to a common pilot supply segment 290B, whichever one of the control chamber of the valve devices 240, 242, 244, 246 has the highest pressure will set the pressure of the pilot supply segment 290B.

FIG. 3 illustrates a hydraulic system 300 with more than one valve arrangement associated with a pressure monitoring system 301 used for detection and/or mitigation of dynamic seal wear. Although three valve arrangements 312, 314, 316 are shown, it can be appreciated by those skilled in the art that two or four or more valve arrangements can be provided. Each valve arrangement 312, 314, 316 can include the single valve device shown in FIG. 1, the multiple valve arrangement shown in FIG. 2, or any combination thereof, used to influence the movement of fluid actuators (not shown). In one example, the valve arrangement may be in close proximity with its corresponding fluid actuator. To this end, the pressuring monitoring system 301 may include components that are disposed in close proximity with its corresponding actuator in a similar manner. Further, multiple pressure sensors and relief valves can be distributed throughout the system for enhance local pressure monitoring.

The system 300 may include a pilot pump 320 with a load-hold check valve 322 to supply pressurized fluid via a pilot supply 324 fluidly coupled between each of the valve arrangements 312, 314, 316. A common drain passage (not shown) may also fluidly coupled between each of the valve arrangements 312, 314, 316 and to a tank 325.

A first relief valve 330 and a plurality of second relief valves 332A, 332B, 332C can be coupled to the drain passage 292, disposed between the control chamber and the tank 214. Each relief valve 330, 332A-C can have a valve element that is movable between a first closed position and a second open position. Each relief valve 330, 332A-C may be operable to maintain its position in the first closed position, until the pressure within the corresponding segments 324A, 324B, 324C, 324D of the pilot supply 324 is greater than a predetermined threshold pressure limit preset with each relief valve, then each relief valve is moved to its second open position. When in the second open position, the fluid within the corresponding segment 324A-D of the pilot supply 324 can be drained to the tank 325. The predetermined threshold pressure of the first relief valve 330 can be set to be less than the predetermined threshold pressure of each of the second relief valves 332A-C.

A pressure sensor 340 coupled between the segment 324B-D of the pilot supply 324 and the corresponding second relief valves 332A-C. The pressure sensor 340 can be associated with the pilot supply segments to detect the pressure of the control fluid within the pilot supply segment 324B-D. The controller 115 may be electronically coupled to each pressure sensor 340 via a communication line 342, and may also be electronically coupled to the electromagnetic devices of the valve arrangements 312, 314, 316 and/or pump 320 via a communication line 344. The controller 115 may communicate a warning via an audio and/or visual indicator 124 to the operator via a communication line 346.

The maximum threshold pressure of each of the relief valves 330, 332A-C can be selected to prevent damage to the pilot system to mitigate the risk of damage to the valve system. Each of the second relief valves 332A-C can be set at a higher pressure limit than the first relief valve 330. The pressure limit of each of the second relief valves 332A-C can be the same or different from one another. To this end, the first relief valve will move to its open position prior to the second relief valve. In this instance, downstream pressure of the pilot supply segments 324B-D can increase during a seal leakage from the high pressure side of the working chamber. Here, since the valve arrangements 312, 314, 316 can be in close proximity to the actuator and separated from one another, whichever one of the valve arrangements 312, 314, 316 has the highest pressure may individually trip the relief valve without affecting the other valve arrangements.

INDUSTRIAL APPLICABILITY

The systems and methods described herein can be used to mitigate and/or detect wear for a dynamic seal associated with a movable valve or piston of a valve device or valve arrangement. The valve device can be any type of valve that uses a pilot pressure and a dynamic seal, such as, e.g., a hydraulic actuator, on/off pilot solenoid, a pressure reducing valve, large or small displacement actuator, etc.

In use, the valve device can facilitate control of fluid flow, such as, e.g., cylinder-to-tank fluid flow or pump-to-cylinder fluid flow. For instance, conventional actuation of the hydraulic actuator can be achieved by substantially simultaneous, operator-controlled actuation of the valve device. Numerous less conventional operating modes can be achieved by actuation of a single valve device or actuation of various combinations of two or more valve devices.

For example, for a single valve device associated with a pressure monitoring system described herein, a proportional electromagnetic device 40 of the valve device, such as, e.g., the PCHE valve device 242, can be energized, and in response the second spring 76 can be compressed. The armature 45 can be urged toward the proximal end 42 of the valve body 20 by the force of the third spring 96. As a result, the first land 70 can move axially toward the proximal end 42 such that the annular chamber 86 is opened to the pilot supply 290. The pilot supply 290 can be then in fluid communication with the proximal and distal control chambers 46, 47 by way of the transverse throughbore 88 and the longitudinal throughbore 80. Thus, the pilot supply pressure can be representative of the control chamber pressure.

The pressure of the fluid in the distal control chamber 47 acts on the proximal end 97 of the second land 55 urging the valve element 22 in the direction toward the distal end 44 of the valve body 20. As a result, the compressed load of the third spring 96 can be reduced, and the armature 45 can be urged toward the distal end 44 of the valve body 20 by the force of the second spring 76. As the armature 45 moves axially in the distal direction, the first land 70 of the armature 45 can reduce the opening between the annular chamber 86 and the pilot supply 290. The opening between the annular chamber 86 and the pilot supply 290 and the opening between the annular chamber 86 and the tank 214 can be reduced until the control chambers 46, 47 hydraulically balance the armature 45.

As the opening between the annular chamber 86 and the pilot supply 290 is reduced, the valve element 22 can be urged in the direction of the proximal end 42 by the first spring 66 and the metering slots 59 (if provided) can provide fluid communication between the annular cavities 50, 52. Then, the main pump 212 can provide pressurized fluid, via the load-hold check valve 286 and the inlet conduit 284, to the second annular cavity 52. From there, the pressurized fluid can be metered to the first annular cavity 50, which can direct the fluid to the cylinder conduit 280, which in turn can supply the fluid to the head end chamber 220 of the actuator 216.

Likewise, a CTHE valve device 240 may also be controlled with the aid of a proportional electromagnetic device 40. In the CTHE valve device 240, the metering slots 59 can provide communication between the annular cavities 50, 52. As a result, fluid in the cylinder conduit 280, received from the head end chamber 220, can be supplied to the tank 214. The rest of the operation is similar to what is described with the valve device 242. The PCRE valve device 244 and the CTRE valve device 246 function similarly to the PCHE valve device 242 and the CTHE valve device 240, respectively, but in relation to the rod end chamber 218 of the actuator 216.

Since the proximal and distal control chambers 46, 47 when pressurized are in communication with one another, the armature 45 will not move since it is hydraulically-balanced. As a result, fluid flowing from the pilot supply 290 and into the distal control chamber 47 can be restricted. However, rather than flow becoming choked at the restriction, the pressure can act on the proximal end 97 of the valve element 22 through the distal control chamber 47 and moves the valve element 22 in a distal direction against the force of the first spring 66 and the flow is relieved to the tank 214 through the metering slots 59 (when provided).

In another example, a single pressure monitoring system described herein can be associated with more than one valve device or valve arrangement, such as described herein. Conventional movement of the actuator 216, such as, e.g., extension of a hydraulic cylinder, can be achieved by substantially simultaneous, operator-controlled actuation of the valve devices 242, 246, and retraction can be achieved by simultaneous operator controlled actuation of the valve devices 244, 240. For example, actuation of the valve device 242 can move its valve element 22 distally to establish fluid flow from the main pump 212 to the head end chamber 220, and actuation of the valve device 242 can move its valve element 22 distally to establish fluid flow from the rod end chamber 218 to the tank 214. Similarly, actuation of the valve device 244 can move its valve element 22 distally to establish flow from the main pump 212 to the rod end chamber 218, and actuation of the valve device 240 can move its valve element 22 distally to establish fluid flow from the head end chamber 220 to the tank 214.

Generally, pressurized control fluid from the pilot pump or source is provided to the pilot control assembly at a design pressure, such as, e.g., up to about 4,200 kPa, for which the components of the pilot control assembly can withstand during normal operation. For example, the first relief valve can be preset to this design pressure. However, the working chamber of the valve device is configured for fluid working pressures of up to about 37,000 to 40,000 kPa. Hence, the dynamic seal is configured to separate these chambers of widely differing fluid pressures. When the dynamic seal begins to wear, the high pressure fluid from the working chamber can tend to leak in the low pressure chamber, thereby causing a pressure rise within the control chamber.

The second relief valves may be operable to maintain its position in the first closed position when the fluid pressure in at least one of the control chambers of the pilot control assembly is below a predetermined threshold. The predetermined threshold pressure can be generally greater than the design pressure, such as, e.g., 5,000 kPa. For example, the second relief valve can be preset to this predetermined threshold pressure. When the control fluid pressure is at or above the predetermined threshold pressure, the second relief valve is moved to its second open position. When in the second open position, the fluid within the drain passage can be drained to the tank. To this end, the first relief valve will move to its open position prior to the second relief valve, thereby allowing the downstream pressure of the corresponding pilot supply segment to build up to the predetermined threshold pressure of the second relief valve.

The pressure sensor 112, when provided, can be operable to sense or measure the fluctuating fluid pressure representative of at least one of the control chambers of the pilot control assembly. The controller 115 may receive signals from the pressure sensor indicative of sensed control fluid pressure via the communication line. The controller may compare the sensed control fluid pressure with a preset threshold pressure or range, such as, e.g., 4200 kPa and above. In one example, the preset threshold pressure can be set based on the settings of the first relief valve and the second relief valve, that is, a pressure greater than the pressure limit of the first relief valve and less than the pressure limit of the second relief valve. For instance, the preset threshold pressure can be set at, e.g., about 4900 kPa, or in the range of, e.g., 4200 to 4900 kPa, for monitoring by the operator. If the sensed control fluid pressure is greater than the preset threshold pressure, the controller can be configured to communicate a warning signal via an audio and/or visual indicator 124, such as an operator interface. The controller may be configured to filter signal or have software triggers such that the sensed pressure is greater than the threshold pressure for a period of time to avoid faulty pressure spike readings.

In view of the above, it is readily apparent that the systems and methods described herein can provide an improved and simplified mitigation and/or detection of dynamic seal wear. However, it is apparent that the systems and methods can be operable without a dynamic seal as can be appreciated by those skilled in the art. This can provide fast detection and notification to the operator of a potential failure prior to its occurrence, without comprising the system's integrity or construction. Moreover, the structure of the assembly is relatively uncomplicated, and can be used for retrofit.

It will be apparent to those skilled in the art that various modifications and variations can be made in the disclosed systems without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims and their equivalents.

What is claimed is:

1. A system, comprising:
    at least one valve device including a valve body and a valve element slidably disposed within a passageway formed in the valve body, wherein a first segment of the valve element and the valve body are arranged to define a working chamber to receive a working fluid at a first pressure, and the valve body and the valve element are arranged to define a control chamber to receive a control fluid at a second pressure, the valve element having a land; and
    an annular seal element disposed between the land and an inner surface, wherein the seal element and the land are together arranged to separate the working chamber and the control chamber and to move with axial movement of the valve element; and
    a pressure monitoring system fluidly coupled to the control chamber; and
    a controller in communication with the pressure monitoring system, configured to:
        receive a signal indicative of the second pressure;
        compare the second pressure with a predetermined pressure; and
        communicate a signal to an operator when the second pressure is at or above the predetermined pressure.

2. The system of claim 1, further including a supply passage extending between the control chamber and a tank.

3. The system of claim 2, further including a relief valve coupled to the supply passage.

4. The system of claim 3, wherein the relief valve is a second relief valve, the system further including a first relief valve coupled to the supply passage, and a check valve disposed downstream of the first relief valve and upstream of the second relief valve, wherein the second relief valve is set at a higher preset pressure limit than the first relief valve.

5. The system of claim 4, wherein the pressure sensor is coupled to the supply passage downstream of the check valve to detect pressure within the supply passage.

6. The system of claim 1, wherein the valve device further includes a pilot control assembly coupled to the supply passage and operable to permit selective pressurization of the control chamber.

7. The system of claim 6, wherein the controller is in communication with the pilot control assembly.

8. A system, comprising:
    at least one valve device including:
        a valve body;
        a valve element slidably disposed within a passageway formed in the valve body, a first segment of the valve element and the valve body arranged to define a working chamber to receive a working fluid at a first pressure, the valve body and the valve element arranged to define a control chamber separated from the working chamber to receive a control fluid at a second pressure, wherein a seal is formed between a land of the valve element and the valve body;
    a supply passage in communication with the control chamber and extending to a tank;
    a check valve coupled to the supply passage;
    a first relief valve coupled to the supply passage and disposed upstream of the check valve; and
    a second relief valve coupled to the supply passage and disposed downstream of the check valve and upstream of the control chamber, the second relief valve having a higher pressure limit than the first relief valve.

9. The system of claim 8, further including a pressure sensor associated with the control chamber; and a controller in communication with the pressure sensor, configured to:
    receive a signal indicative of the second pressure;
    compare the second pressure with a predetermined pressure; and
    communicate a warning signal to an operator when the second pressure is at or above the predetermined pressure.

10. The system of claim 8, further including a pilot pump coupled to the supply passage upstream of the first relief valve.

11. A method of mitigating seal wear provided with at least one valve device, the valve device including a valve body having a passageway formed therein, a valve element disposed within the passageway of the valve body and operable to move axially relative to the valve body, a working chamber defined between the valve element and the valve body, a control chamber defined between the valve element and the valve body and separated from the working chamber by a land, an annular seal disposed about the land and configured to move with axial movement of the valve element, a check valve coupled to the supply passage, a first relief valve coupled to the supply passage upstream of the check valve, and a second relief valve coupled to the supply passage downstream of the check valve and upstream of the control chamber, wherein the second relief valve is set a higher preset pressure limit than the first relief valve, the method comprising:

supplying pressurized working fluid at a first pressure to the working chamber;

supplying pressurized control fluid at a second pressure to the control chamber;

selectively moving the second relief valve when the pressure of a fluid in the control chamber is at the higher preset pressure limit to permit passage of said fluid at said higher preset pressure limit to a tank.

12. The method of claim 11, wherein a pressure sensor is coupled to the supply passage downstream of the check valve and upstream of the control chamber, the method further including detecting a pressure associated with the supply passage with the pressure sensor.

13. The method of claim 12, further including coupling a controller to the pressure sensor, wherein the controller is configured to:

receive a signal from the pressure sensor indicative of the pressure within the supply passage;

compare the indicated pressure within the supply passage with a predetermined pressure; and communicate a warning signal to an operator when the indicated pressure within the supply passage is at or above the predetermined pressure.

14. The method of claim 11, wherein a pilot pump is coupled to the supply passage upstream of the first relief valve.

* * * * *